United States Patent Office 3,530,191
Patented Sept. 22, 1970

3,530,191
PRODUCTION OF DIMETHYL SULFIDE FROM TRITHIANE AND METHANOL
Hans-Dieter Rupp, Erlenbach, Gerhard Meyer, Obernburg, and Helmut Mägerlein, Erlenbach, Germany, assignors to Glanzstoff AG, Wuppertal, Germany
No Drawing. Filed Feb. 28, 1968, Ser. No. 708,810
Claims priority, application Germany, Mar. 2, 1967, G 49,456
Int. Cl. C07c *149/10*
U.S. Cl. 260—609
12 Claims

ABSTRACT OF THE DISCLOSURE

Process for producing dimethyl sulfide by reacting trithiane with methanol at a temperature of about 200–400° C. in the presence of a strong acid catalyst or a Friedel-Crafts catalyst, preferably under anhydrous conditions and at an elevated pressure. The resulting dimethyl sulfide is readily oxidized to dimethyl sulfoxide which is a valuable solvent.

---

This invention is concerned with the conversion of trithiane into dimethyl sulfide in good yields and high purity, by reacting the trithiane with methanol in the presence of certain catalysts. More particularly, the invention is concerned with a method of utilizing trithiane which is obtained as a by-product during the spinning of certain viscose rayon filaments. By converting the trithiane into dimethyl sulfide, the carbon and sulfur content of the otherwise wasted by-product is recovered in a much more useful form.

Dimethyl sulfide has been produced according to a number of known processes, for example by the reaction of potassium sulfide with methyl chloride or by heating methyl isothiocyanate with sulfuric acid.

It is an object of the invention to provide a method of producing dimethyl sulfide directly from trithiane as the initial material. It is also an object of the invention to provide a process for converting trithiane into dimethyl sulfide which can then be easily recovered in high yields by a simple fractional distillation. These and other objects and advantages of the invention will be apparent from the following detailed disclosure.

It has now been found, in accordance with the invention, that dimethyl sulfide is readily obtained by heating a mixture of trithiane with an excess of methanol, e.g. in a molar ratio of trithiane: methanol of approximately 1:4 to 1:15 in the presence of a strong acid catalyst or a Friedel-Crafts catalyst and at a temperature of about 200° C. to 400° C.

Trithiane is the cyclic trimer of thioformaldehyde of the formula

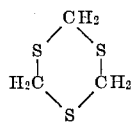

This compound is formed as one by-product when spinning viscose in formaldehyde-containing spinning baths. However, it is also generally possible to form trithiane or trithioformaldehyde by reacting formaldehyde and hydrogen sulfide under strongly acidic conditions. Trithiane can also be prepared from commercial formaldehyde, hydrogen sulfide gas and hydrochloric acid as disclosed by R. W. Bost et al., "Organic Syntheses," vol. 16, pages 81–83 (1936). Other methods for producing trithiane are also known, and the present invention is not limited to the particular source of the trithiane. However, the most advantageous use of the new process relates to the conversion of trithiane which is normally precipitated as a practically useless by-product in the production of viscose rayon.

The reaction between trithiane and methanol requires at least four mols of methanol for each mol of trithiane in order to provide stoichiometric proportions of the two components, and there is preferably employed a stoichiometric excess of the methanol. For example, one should normally employ a molar ratio of trithiane:methanol of approximately 1:4 to 1:15, preferably about 1:7 to 1:9. The preferred reaction temperature is about 220° C. to 350° C. The best results are achieved when carrying out the reaction under anhydrous conditions or at least substantially anhydrous conditions.

In general, the catalyst is either a strong acid as commonly used in acylation reactions, especially hydrogen chloride, toluene sulfonic acid and boron trifluoride-etherate or the well known Friedel-Crafts catalysts such as aluminum trichloride. The amount of the catalyst can be varied over a broad range, for example between about 0.05 to 10% by weight with reference to the trithiane. In addition to the above-named specific catalysts which are especially preferred for purposes of the present invention, the following catalysts can also be named: phosphoric acid, sulfuric acid, hydrogen fluoride, boron trichloride, phosphorus trichloride, phosphorus pentachloride, phosphorus-oxychloride, tin (II) chloride, tin (IV) chloride, zinc chloride.

The process of the invention is advantageously carried out in an autoclave under an elevated pressure for a period of time sufficient to carry the reaction to completion. The resulting dimethyl sulfide can then be distilled off directly from the autoclave, preferably after the addition of water, for example about 100 to 1500% by weight of water, with reference to the initial trithiane. The pressure is not a critical factor in the reaction. When working in an autoclave, the pressure is that which arises due to the amount of the reaction components and the particular temperature employed.

Upon completion of the reaction, it is preferable to cool the reaction mixture and then to release the pressure before recovering the dimethyl sulfide product. Upon releasing the pressure, the reaction products can be collected in a cooled receiver, or by maintaining some pressure on the contents of the autoclave, they can be subjected to fractional distillation directly from the autoclave so as to obtain a very pure dimethyl sulfide.

The invention is further illustrated by the following detailed examples which set forth especially preferred embodiments of the invention.

EXAMPLE 1

There was introduced into a 100 ml. autoclave 20 grams of trithiane and about 50 ml. methanol (molar ratio 1:8). To this there was added 2 grams of water-free (anhydrous) AlCl₃, and the mixture was then heated to a temperature of 230–240° C. After three hours, a pressure of about 200 atm. arose and the reaction was completed. After cooling to 100° C., the contents of the autoclave were released into a cooled receiver. A gas chromatographic analysis of the reaction product obtained in this manner exhibited a yield of 99% of theory of dimethyl sulfide, with reference to the initial trithiane.

Corresponding to Example 1, the process was also carried out with the use of various catalysts and in accordance with other conditions as set forth in the following table:

TABLE

| Example | Molar ratio Trithiane: Methanol | Catalyst | Amount (grams) | Temp. (° C.) | Pressure (atm.) | Reaction time (hrs.) | Yield, percent of theory |
|---|---|---|---|---|---|---|---|
| 2 | 1:8 | HCl (gas) | 2 | 230–240 | 190 | 4 | 93 |
| 3 | 1:8 | BF³-etherate | 2 | 230–240 | 220 | 2 | 92 |
| 4 | 1:8 | p-Toluene sulfonic acid | 2 | 230–240 | 185 | 3 | 84 |
| 5 | 1:8 | AlCl³ | 0.02 | 270 | 250 | 3 | 93 |
| 6 | 1:8 | AlCl³ | 0.4 | 230–240 | 200 | 5 | 98 |
| 7 | 1:15 | AlCl³ | 0.02 | 270 | 220 | 6 | 44 |

EXAMPLE 8

In a 100 ml. autoclave there was introduced 20 grams of trithiane with 50 ml. methanol and 0.1 gram of AlCl₃, and the contents were heated for 14 hours at 230–240° C. whereby the pressure reached 170 atm. The autoclave was then cooled to 0° C., the residual pressure released to about 20 atm. and the remaining contents of the autoclave subjected to fractional distillation with the addition of 100 ml. H₂O. There were obtained 26 grams of a distillate (B.P. 36–37° C.). This corresponds to a yield of 96% of theory with reference to the trithiane.

EXAMPLE 9

In a bomb tube of 100 ml. capacity, there was introduced 0.54 gram of trithiane and 1.25 ml. of methanol as well as 54 mg. AlCl₃. This was then heated for 3 hours at 350° C. After termination of the reaction, the tube was cooled with Dry Ice and the reaction product analyzed by gas chromatography. The yield of dimethyl sulfide amounted to 94% of theory, with reference to the trithiane.

As noted above, the process of the invention is especially advantageous because it permits the conversion of trithiane, which is precipitated as a practically useless byproduct in the production of rayon, into dimethyl sulfide in almost quantitative yields. The dimethyl sulfide product can be readily converted to dimethyl sulfoxide by oxidation in a simple manner according to known processes. For example, it is possible to subject the dimethyl sulfide to an air-oxidation in the presence of nitrogen oxides in accordance with U.S. Pat. No. 2,581,050. Dimethyl sulfoxide is a known solvent having a number of useful technical and commercial applications.

The invention is hereby claimed as follows:

1. A process for the production of dimethyl sulfide which comprises heating a mixture of trithiane:methanol in a molar ratio of approximately 1:4 to 1:15 in the presence of a catalyst selected from the group consisting of strong acids and Friedel-Crafts catalysts at a temperature of about 200° C. to 400° C.

2. A process as claimed in claim 1 wherein the amount of the catalyst is about 0.05 to 10% by weight with reference to the trithiane.

3. A process as claimed in claim 1 wherein the catalyst is AlCl₃.

4. A process as claimed in claim 1 wherein the catalyst is hydrogen chloride.

5. A process as claimed in claim 1 wherein the catalyst is boron trifluoride etherate.

6. A process as claimed in claim 1 wherein the catalyst is p-toluene sulfonic acid.

7. A process as claimed in claim 1 wherein said mixture is heated under substantially anhydrous conditions.

8. A process as claimed in claim 7 wherein the temperature is about 220° C. to 350° C.

9. A process as claimed in claim 7 where the molar ratio of trithiane:methanol is about 1:7 to 1:9.

10. A process as claimed in claim 1 wherein said mixture is heated in an autoclave under an elevated pressure and the resulting dimethyl sulfide is distilled off directly from the autoclave.

11. A process as claimed in claim 10 wherein the reaction product in said autoclave is cooled after said heating step, a small amount of water is added and dimethyl sulfide is fractionally distilled from the autoclave.

12. A process as claimed in claim 11 wherein said catalyst is anhydrous AlCl₃.

References Cited

FOREIGN PATENTS 1,248,647   8/1967   Germany.

OTHER REFERENCES

Lee et al.: "J. Org. Chem.," vol. 3 (1939), pp. 48 to 53.

CHARLES B. PARKER, Primary Examiner

D. R. PHILLIPS, Assistant Examiner